(12) United States Patent
Owen et al.

(10) Patent No.: US 9,225,144 B2
(45) Date of Patent: Dec. 29, 2015

(54) WALK-OFF COMPENSATOR WITH TILT FUNCTION

(71) Applicants: Joseph M. Owen, Derry, NH (US); Nathan E. Rines, Hollis, NH (US)

(72) Inventors: Joseph M. Owen, Derry, NH (US); Nathan E. Rines, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/688,224

(22) Filed: Apr. 16, 2015

(65) Prior Publication Data

US 2015/0222080 A1  Aug. 6, 2015

Related U.S. Application Data

(62) Division of application No. 13/809,434, filed as application No. PCT/US2012/034364 on Apr. 20, 2012, now Pat. No. 9,036,250.

(60) Provisional application No. 61/481,057, filed on Apr. 29, 2011.

(51) Int. Cl.
| | |
|---|---|
| *G02F 1/39* | (2006.01) |
| *H01S 3/108* | (2006.01) |
| *G02F 1/35* | (2006.01) |
| *G02B 7/18* | (2006.01) |
| *G02B 26/08* | (2006.01) |
| *H01S 3/02* | (2006.01) |
| *H01S 3/08* | (2006.01) |
| *H01S 3/094* | (2006.01) |

(Continued)

(52) U.S. Cl.
CPC .............. *H01S 3/108* (2013.01); *G02B 7/1805* (2013.01); *G02B 26/0883* (2013.01); *G02F 1/353* (2013.01); *G02F 1/39* (2013.01); *H01S 3/025* (2013.01); *H01S 3/08059* (2013.01); *H01S 3/0941* (2013.01); *H01S 3/094042* (2013.01); *H01S 3/1655* (2013.01); *G02F 2001/3503* (2013.01); *G02F 2001/3505* (2013.01); *G02F 2001/3542* (2013.01); *G02F 2202/40* (2013.01); *G02F 2203/69* (2013.01)

(58) Field of Classification Search
USPC .................................................. 359/326–332
See application file for complete search history.

(56) References Cited

U.S. PATENT DOCUMENTS

| | | | |
|---|---|---|---|
| 5,033,057 | A | 7/1991 | Bosenberg et al. |
| 5,047,668 | A | 9/1991 | Bosenberg |

(Continued)

*Primary Examiner* — Daniel Petkovsek
(74) *Attorney, Agent, or Firm* — Finch & Maloney PLLC

(57) ABSTRACT

Techniques and structure are disclosed for implementing a spatial walk-off compensation mechanism having an integral tilt function. In some embodiments, the mechanism may comprise a tilt-ball mount having an integrated walk-off compensation medium. In some embodiments, the mechanism may be configured to receive an output beam from a non-linear converter (e.g., optical parametric oscillator or OPO) implementing a non-linear medium comprising a bi-refringent material (e.g., zinc germanium phosphide, or ZnGeP$_2$; cadmium silicon phosphide, or CdSiP$_2$). In some embodiments, the walk-off compensation medium may comprise the same material and/or have the same cut as the non-linear medium. In some embodiments, the mechanism may be manually and/or mechanically adjusted/repositioned to reduce beam walk-off and/or to more precisely direct the beam. In some embodiments, the mechanism may be implemented in mid-infrared (MIR) applications. Numerous configurations and variations will be apparent in light of this disclosure.

9 Claims, 3 Drawing Sheets

(51) Int. Cl.
*H01S 3/0941* (2006.01)
*H01S 3/16* (2006.01)

(56) References Cited

U.S. PATENT DOCUMENTS

| | | | |
|---|---|---|---|
| 5,652,757 A | 7/1997 | Okazaki et al. | |
| 6,172,800 B1 * | 1/2001 | Kouta | 359/328 |
| 6,373,868 B1 | 4/2002 | Zhang | |
| 6,614,584 B1 | 9/2003 | Govorkov et al. | |
| 6,882,465 B1 | 4/2005 | Boulanger et al. | |
| 7,339,722 B2 * | 3/2008 | Kelley | G02F 1/3544 359/326 |
| 9,036,250 B2 * | 5/2015 | Owen et al. | 359/330 |
| 2009/0128930 A1 | 5/2009 | Fujioka et al. | |
| 2009/0237777 A1 | 9/2009 | Meissner et al. | |

* cited by examiner

WALK-OFF COMPENSATOR WITH TILT FUNCTION

CROSS-REFERENCE TO RELATED APPLICATIONS

This application is a divisional application of U.S. application Ser. No. 13/809,434 filed Jan. 10, 2013 and claims the benefit of and priority to U.S. Provisional Patent Application No. 61/481,057, filed on Apr. 29, 2011, which is herein incorporated by reference in its entirety.

FIELD OF THE DISCLOSURE

The invention relates to lasers, and more particularly to spatial walk-off compensation.

BACKGROUND

In some non-linear converter applications, emissions from a non-linear converter such as an optical parametric oscillator (OPO), for example, may drift apart or otherwise fail to properly overlap—phenomenon known as spatial walk-off. Efforts may be made to compensate for walk-off, and so make emissions from a non-linear converter better overlap. However, there are a number of non-trivial challenges to achieving walk-off compensation.

SUMMARY

One embodiment of the present invention provides an apparatus including a tilt-ball mount having a through-hole aperture formed therein and a walk-off compensation medium, wherein at least a portion of the walk-off compensation medium is disposed within the through-hole aperture of the tilt-ball mount. In some cases, the tilt-ball mount has a geometry that is spherical, cylindrical, ellipsoidal, polyhedral, or prismatic. In some cases, the tilt-ball mount is configured to be tilted and/or rolled. In some cases, the walk-off compensation medium comprises a zinc germanium phosphide ($ZnGeP_2$) crystal or a cadmium silicon phosphide ($CdSiP_2$) crystal. In some cases, the walk-off compensation medium has a geometry that is polyhedral, prismatic, or cylindrical. In some cases, the apparatus is configured to receive a beam from a non-linear converter and to achieve at least one of beam walk-off compensation and/or precision beam directing. In some such cases, the non-linear converter comprises an optical parametric oscillator (OPO). In some other such cases, the non-linear converter utilizes a non-linear medium comprising a zinc germanium phosphide ($ZnGeP_2$) crystal and/or a cadmium silicon phosphide ($CdSiP_2$) crystal. In some other such cases, the apparatus further includes a stabilizer configured to minimize and/or prevent movement of the tilt-ball mount once in a desired positioned.

Another embodiment of the present invention provides a system including a non-linear converter configured to receive a pump beam and generate an output beam and a walk-off compensation mechanism having an integral tilt function, wherein the walk-off compensation mechanism is configured to be tilted and/or rolled to achieve at least one of walk-off compensation and/or precision directing for the output beam. In some cases, the non-linear converter comprises an optical parametric oscillator (OPO). In some cases, the non-linear converter utilizes a non-linear medium comprising a zinc germanium phosphide ($ZnGeP_2$) crystal and/or a cadmium silicon phosphide ($CdSiP_2$) crystal of a given cut. In some cases, the walk-off compensation mechanism includes a tilt-ball mount having a through-hole aperture formed therein and a walk-off compensation medium, wherein at least a portion of the walk-off compensation medium is disposed within the through-hole aperture of the tilt-ball mount. In some cases, the tilt-ball mount has a geometry that is spherical, cylindrical, ellipsoidal, polyhedral, or prismatic. In some other such cases, the walk-off compensation medium comprises a zinc germanium phosphide ($ZnGeP_2$) crystal or a cadmium silicon phosphide ($CdSiP_2$) crystal. In some other such cases, the walk-off compensation medium at least one of comprises the same material as the non-linear medium and/or has the same cut as the non-linear medium. In some other such cases, the system further includes a stabilizer, wherein the stabilizer includes a seat configured to receive a first portion of the tilt-ball mount, a chassis configured to support the seat, a post operatively coupled to the chassis, a clamp arm operatively coupled to the post, wherein the clamp arm is configured to engage a second portion of the tilt-ball mount, and a fastener configured to secure the clamp arm once it engages the second portion of the tilt-ball mount.

Another embodiment of the present invention provides a method including the steps of producing a beam with a non-linear converter utilizing a non-linear medium comprising a bi-refringent material of a given cut, directing the beam to a walk-off compensation mechanism having an integral tilt function and configured to be tilted and/or rolled to achieve at least one of walk-off compensation and/or precision directing for the beam, wherein the walk-off compensation mechanism includes a tilt-ball mount having a through-hole aperture formed therein and a walk-off compensation medium that at least one of comprises the same bi-refringent material as the non-linear medium and/or has the same cut as the non-linear medium, wherein at least a portion of the walk-off compensation medium is disposed within the through-hole aperture of the tilt-ball mount, and adjusting the walk-off compensation mechanism to compensate for beam walk-off and/or to precisely direct the beam. In some cases, the non-linear converter comprises an optical parametric oscillator (OPO). In some cases, the non-linear medium comprises a zinc germanium phosphide ($ZnGeP_2$) crystal and/or a cadmium silicon phosphide ($CdSiP_2$) crystal.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
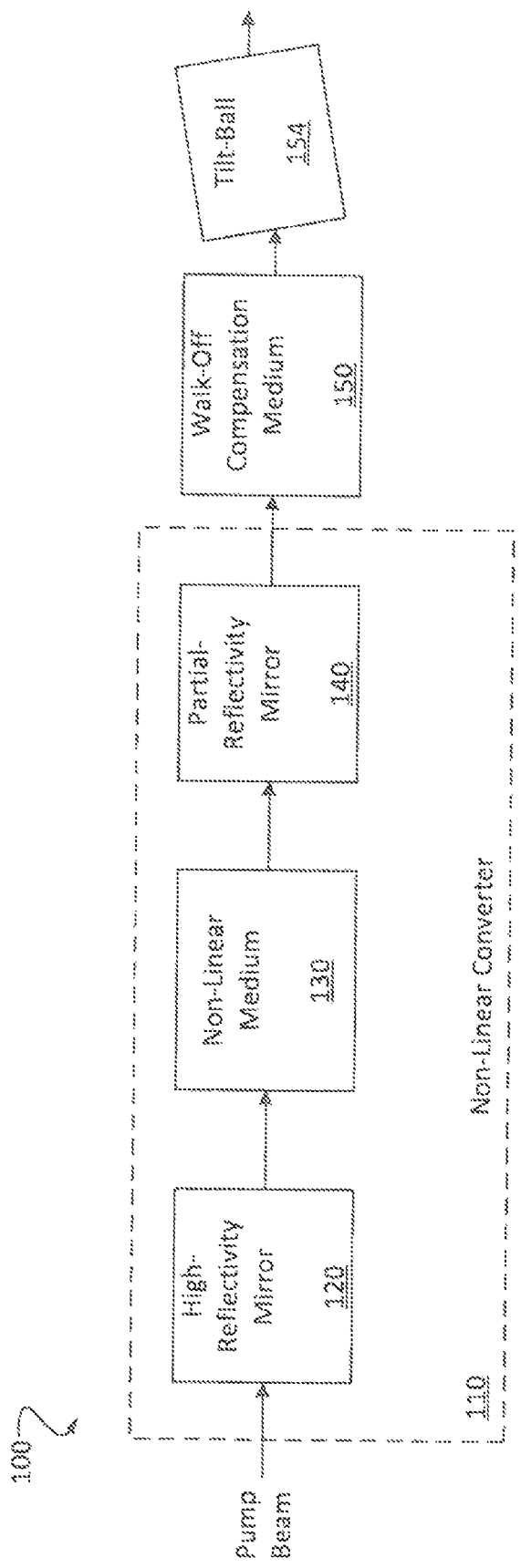
FIG. 1 is a block diagram depicting an example approach to providing walk-off compensation.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and structure are disclosed for implementing a spatial walk-off compensation mechanism having an integral tilt function. In some embodiments, the mechanism may comprise a tilt-ball mount having an integrated walk-off compensation medium. In some embodiments, the mechanism may be configured to receive an output beam from a non-linear converter (e.g., optical parametric oscillator or OPO) implementing a non-linear medium comprising a bi-refringent material (e.g., zinc germanium phosphide, or $ZnGeP_2$; cadmium silicon phosphide, or $CdSiP_2$). In some embodiments, the walk-off compensation medium may comprise fee same material and/or have the same cut as the non-linear medium. In some embodiments, the mechanism may be manually and/or mechanically adjusted/repositioned to reduce beam walk-off and/or to more precisely direct the beam. In some embodiments, the mechanism may be implemented in mid-infrared (MIR) applications. Numerous configurations and variations will be apparent in light of this disclosure.

General Overview

As will be appreciated, a non-linear converter (e.g., an optical parametric oscillator or OPO) which implements an anisotropic medium (e.g., a single crystal of a bi-refringent material), for example, is susceptible to producing output beams which experience a phenomenon known as beam walk-off, wherein the emissions drift apart or otherwise fail to property overlap. In such cases, the waves interacting within a focused beam lose their spatial overlap during propagation, and thus the output beams may have, for instance, a broader amplitude and/or broader intensity profile than desired for a given application.

As will further be appreciated, OPOs which implement, for example, a single crystal of a bi-refringent material (e.g., zinc germanium phosphide, $ZnGeP_2$ or ZGP; cadmium silicon phosphide or $CdSiP_2$) are susceptible to producing output beams which experience beam walk-off; that is, the beam centroid of the residual pump beam at the exit of the OPO is physically displaced from the centroids of the signal and idler beams produced by the OPO, which may cause problems for a telescope that receives the beams.

Walk-off compensation may be utilized to reduce/mitigate beam walk-off (e.g., make the emissions from a non-linear converter better overlap). For instance, FIG. 1 is a block diagram depicting an example approach to providing walk-off compensation. As can be seen, a laser cavity 100 may include, for example, a non-linear converter 110 (e.g., OPO) implementing a high-reflectivity mirror 120 at its input, a partial-reflectivity mirror 140 at its output, and a non-linear medium 130 (e.g., a non-linear crystal) there between. A pump beam may be provided to the non-linear converter 110 at its input coupler (e.g., incident to the high-reflectivity mirror 120). To provide walk-off compensation, a walk-off compensation medium 150 (e.g., a crystal) is positioned downstream of the non-linear converter 110 and configured to receive its output (e.g., exiting the partial-reflectivity mirror 140). The walk-off compensation crystal 150 is of the same type and cut as that utilized as non-linear medium 130. In addition, a separate, discrete tilt-ball 154 is further included downstream of the walk-off compensation medium 150 and configured to receive its output. The tilt-ball 154 comprises a metal ball having a thick piece of glass (e.g., zinc selenide, silicon, germanium, silicon germanium, or sapphire) secured therein, into which the output beam of the walk-off compensation medium 150 is directed. Upon tilting the tilt-ball 154, the beam may be directed, for instance, to a next stage or other location where it can be further processed or otherwise utilized.

However, such a design is associated with a number of non-trivial issues and complications. For example, implementing tilt-ball 154 and walk-off compensation crystal 150 as separate, discrete optical components: (1) increases the overall size of laser cavity 100; (2) increases the overall bulk, footprint, and/or weight of a laser system implementing such a laser cavity 100; (3) reduces the dependability of the laser system implementing such a laser cavity 100, given that there are more optical components which may malfunction and/or degrade over time; and (4) reduces the integrity of the output beam, given that overall beam loss increases as the number of optical components disposed in the beam line increases. Other inherent complications and non-trivial issues associated with laser cavity designs implementing tilt-balls 154 and separate, discrete walk-off compensation media 150 will be apparent in light of this disclosure.

Therefore, there is need for techniques for providing spatial walk-off compensation while reducing the number of optical components in the beam line, minimizing the size of a given laser cavity, and/or minimizing the bulk, footprint, and/or weight of a given laser system.

Thus, and in accordance with an embodiment of the present invention, techniques are disclosed for implementing a walk-off compensator having an integral tilt function. In some embodiments, a walk-off compensation medium (e.g., crystal of a given material and cut) may be integrated into or otherwise operatively coupled with a tilt-ball mount, for example. The resultant mechanism may be implemented, in some embodiments, downstream of a non-linear converter (e.g., optical parametric oscillator or OPO) to redirect its output beam to help its emissions achieve a desired degree of overlap (e.g., minimize/eliminate beam walk-off). In accordance with an embodiment, the mechanism may be manually and/or mechanically adjusted to achieve the desired beam redirection.

In accordance with an embodiment, techniques disclosed herein may be implemented, for example, in a laser cavity configured for use in mid-infrared (MIR) (e.g., in the range of about 3-8 μm) applications. However, the claimed invention is not so limited; for instance, and in accordance with an embodiment of the present invention, techniques disclosed herein may be implemented in any application where spatial walk-off results, for example, from bi-refringence of a non-linear medium.

As will be appreciated, implementation of a walk-off compensator having an integral tilt function, in accordance with an embodiment, may eliminate the need for inclusion of a separate, discrete tilt-ball component (e.g., such as the tilt-ball 154 of FIG. 1). Thus, and in accordance with an embodiment, one or more of the following benefits/advantages may be realized: (1) a reduction in the overall size of the laser cavity which includes such a walk-off compensator having an integral tilt function; (2) a reduction in the overall bulk, footprint, and/or weight of a laser system implementing such a laser cavity; (3) an increase in the dependability of such a laser system, given that there are comparatively fewer optical components which may malfunction and/or degrade over time; and/or (4) an increase in the integrity of the output beam, given that overall beam loss decreases as the number of optical components disposed in the beam line decreases. Other benefits/advantages associated with one or more embodiments of the present invention will depend on a given application and will be apparent in light of this disclosure.

System Architecture and Operation

Figure 2:
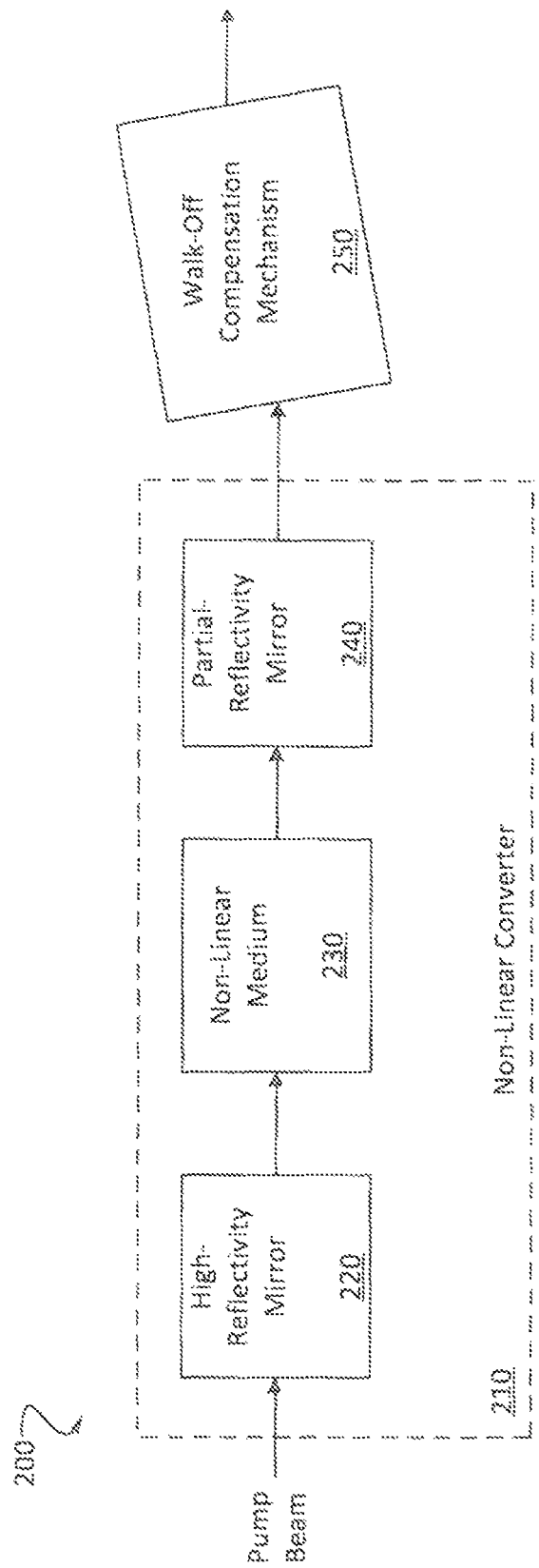
FIG. 2 is a block diagram of a laser cavity implementing a walk-off compensation mechanism configured in accordance with an embodiment of the present invention.

FIG. 2 is a block diagram of a laser cavity 200 implementing a walk-off compensation mechanism 250 configured in accordance with an embodiment of the present invention. As can be seen, laser cavity 200 may include, for example, a non-linear converter 210 (e.g., an optical parametric oscillator or OPO) which suffers from beam walk-off (e.g., due to bi-refringence of its non-linear medium 230). In some embodiments, a walk-off compensation mechanism 250 may be implemented downstream of non-linear converter 210. Laser cavity 200 may include additional, fewer, and/or different elements or components from those here described, as will be appreciated in light of this disclosure. The claimed invention is not intended to be limited to any particular laser cavity or laser system configurations, but can be used with numerous configurations in numerous applications, as will be appreciated in light of this disclosure.

In accordance with an embodiment, a pump beam may be provided to non-linear converter 210 by any suitable pump laser source, including, but not limited to: a fiber laser (e.g., a thulium-doped fiber laser); a semiconductor diode laser (e.g., gallium arsenide or GaAs; indium phosphide or InP); and/or a solid-state laser (e.g., Q-switched Ho:YAG; Lu:YAG). The pump beam may be of any given wavelength or range of wavelengths (e.g., less than about 2 μm) and may be continuous wave (CW) or pulsed (e.g., if non-linear converter 210 is an OPO), in accordance with an embodiment, as suitable for a given application. Other suitable sources and/or wavelengths of the pump beam will be apparent in light of this disclosure.

As can be seen, the pump beam may be received at an input end of non-linear converter 210, which may include, for example, a high-reflectivity mirror 220 or other input coupler. As will be appreciated, high-reflectivity mirror 220 may be configured/implemented as conventionally done. For instance, in one specific example embodiment, high-reflectivity mirror 220 may be configured/implemented as a zinc selenide (ZnSe) substrate having one or more suitable high-reflectivity coatings. Other suitable configurations/types of high-reflectivity mirror 220 will depend on a given application and/or other componentry of non-linear converter 210 (e.g., a corresponding partial-reflectivity mirror 240, discussed in detail below) and will be apparent in light of this disclosure.

As can further be seen, the beam subsequently may be received by a non-linear medium 230. In accordance with an embodiment, non-linear medium 230 may be, for example, a high-refractive-index, bi-refringent material such as, but not limited to: zinc germanium phosphide ($ZnGeP_2$ or ZGP); and/or cadmium silicon phosphide ($CdSiP_2$). In some embodiments, non-linear medium 230 may be implemented as a single crystal of a given cut. In some cases, and in accordance with an embodiment, the type and/or cut of non-linear medium 230 may be chosen, at least in part, based on the desired output wavelength range (e.g., MIR) of non-linear converter 210. Other suitable materials and/or configurations for non-linear medium 230 will depend on a given application and will be apparent in light of this disclosure.

As can further be seen, after passage through non-linear medium 230, the beam may be directed to an output end of non-linear converter 230, which may include, for example, a partial-reflectivity mirror 240 or other output coupler. As with the aforementioned high-reflectivity mirror 220, partial-reflectivity mirror 240 may be configured/implemented as conventionally done. For instance, in one specific example embodiment, partial-reflectivity mirror 240 may be configured/implemented as a zinc selenide (ZnSe) substrate having one or more suitable partial-reflectivity coatings. In some instances, the type, geometry, and/or configuration of partial-reflectivity mirror 240 may be chosen, at least in part, based on the type, geometry, and/or configuration of high-reflectivity mirror 220. Other suitable configurations/types of partial-reflectivity mirror 240 will depend on a given application and will be apparent in light of this disclosure.

Upon exiting non-linear converter 210, the beam may be made available for further processing and/or utilization. However, as previously noted, at this stage the beam may exhibit spatial walk-off effects (e.g., the emissions may drift apart or otherwise fail to properly/desirably overlap, resulting in a broader amplitude and/or a broader intensity profile than desired), which may make the beam unsuitable for some applications or otherwise cause problems for a telescope that receives the beams. Therefore, as will be appreciated, it may be desirable to implement one or more walk-off compensation techniques disclosed herein to mitigate/eliminate the effects of beam walk-off.

Thus, and in accordance with an embodiment of the present invention, a walk-off compensation mechanism 250 may be implemented downstream of non-linear converter 210 and configured, for example, to receive its output beam and perform one or more functions including, but not limited to: (1) beam walk-off compensation; and/or (2) precision beam direction. In some cases, walk-off compensation mechanism 250 may help to minimize/eliminate the walk-off effect associated, for example, with a non-linear converter 210 (e.g., an OPO) implementing a single crystal of bi-refringent material (e.g., ZGP or $CdSiP_2$) as its non-linear medium 230. Other suitable configurations/uses for walk-off compensation mechanism 250 will depend on a given application and will be apparent in light of this disclosure.

Figure 3A:
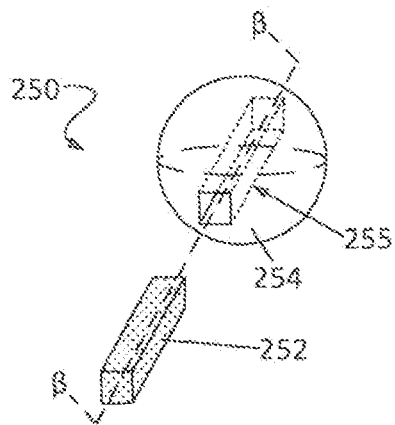
FIG. 3A illustrates a perspective view of a walk-off compensation mechanism configured in accordance with an embodiment of the present invention.
Figure 3B:
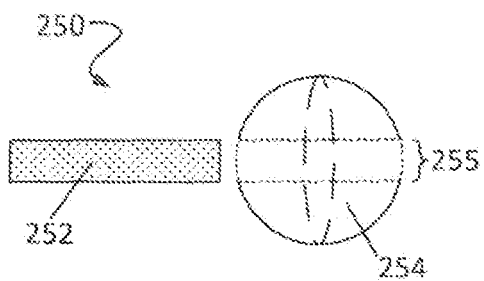
FIG. 3B illustrates a cross-section view of the walk-off compensation mechanism of FIG. 3A taken along dashed line β-β therein.

FIG. 3A illustrates a perspective view of a walk-off compensation mechanism 250 configured in accordance with an embodiment of the present invention, and FIG. 3B illustrates a cross-section view of the compensation mechanism 250 of FIG. 3A taken along dashed line β-β therein. As can be seen, walk-off compensation, mechanism 250 may include a walk-off compensation medium 252, which, in accordance with an embodiment, may comprise the same material and/or be configured with the same cut as, for example, non-linear medium 230 implemented upstream in non-linear converter 210 (e.g., ZGP and/or $CdSiP_2$), discussed in detail below.

In accordance with an embodiment, walk-off compensation medium 252 may be of any desired dimensions (e.g., length, width, height, circumference, etc.) and/or geometry (e.g., polyhedral, prismatic, cylindrical, etc.) suitable for a given application and may be chosen, at least in part, based on the desired amount of beam displacement (e.g., the beam centroid spatial translation to be achieved to yield the desired amount of beam overlapping). In one specific example embodiment, walk-off compensation medium 252 may be configured as, for example, as a square prism (e.g., length in the range of about 5-15 mm; cross-section area is the range of about 16-25 $mm^2$). Other suitable dimensions, geometries, and/or configurations for walk-off compensation medium 252 will depend on a given application and will be apparent in light of this disclosure.

As previously noted, a non-linear converter 210 (e.g., OPO) which implements, for example, a single crystal of a bi-refringent material (e.g., zinc germanium phosphide, ZnGeP$_2$ or ZGP; cadmium silicon phosphide or CdSiP$_2$) as its non-linear medium 230 may be susceptible to producing output beams which experience beam walk-off. Thus, and in accordance with a specific example embodiment, in some cases in which non-linear medium 230 is a single crystal of ZGP or CdSiP$_2$ of a given cut, walk-off compensation medium 252 similarly may comprise a single crystal of ZGP or CdSiP$_2$, respectively, of the same cut.

Given that walk-off compensation medium 252 is external to or otherwise discrete from non-linear converter 210 (e.g., not part of the resonator, and so subjected to lower beam intensity), in accordance with an embodiment, it may be of lower quality (e.g., lower purity, lower coating quality, and/or lower damage threshold, etc.) than non-linear medium 230.

As can further be seen, in some embodiments, walk-off compensation mechanism 250 may include a tilt-ball mount 254. In accordance with an embodiment, tilt-ball mount 254 may comprise, for example, a metal (e.g., aluminum, stainless steel, titanium, etc.) or other suitable material that is compatible, for instance, with walk-off compensation medium 252, tilt-ball seat 285 (discussed in detail below), and/or an optionally included quantity of adhesive (discussed in detail below). Furthermore, and in accordance with an embodiment, tilt-ball mount 254 may be of any desired dimensions (e.g., length, width, height, circumference, etc.) and/or geometry (e.g., spherical, cylindrical, ellipsoidal, polyhedral, prismatic, etc.) suitable for a given application and may be chosen, at least in part, based on the desired amount of beam displacement (e.g., the beam centroid spatial translation to be achieved to yield the desired amount of beam overlapping). In one specific example embodiment, tilt-ball mount 254 may be configured, for example, as a 10-12 mm diameter sphere and/or be capable of moving/displacing the beam by about 1 mm. Other suitable materials, dimensions, geometries, and/or configurations for tilt-ball mount 254 will depend on a given application and will be apparent in light of this disclosure. For example, tilt-ball mount 254 alternatively may be configured as a tip-tilt mount or an azimuth over elevation yolk.

In some embodiments, tilt-ball mount 254 may be configured with an aperture, recess, or other feature formed therein and designed to receive/retain at least a portion of walk-off compensation medium 252. For instance, in one specific example embodiment, tilt-ball mount 254 includes a through-hole aperture 255 that is appropriately dimensioned to securely receive/mount walk-off compensation medium 252 (e.g., the dimensions and/or geometry of through-hole aperture 255 may be made to accommodate those of walk-off compensation medium 252). In some embodiments, through-hole aperture 255 may be configured to provide a friction fit that suitably secures/mounts walk-off compensation medium 252 within/on tilt-ball mount 254. In some embodiments, through-hole aperture 255 may be configured to receive, for example, an epoxy or other appropriate adhesive substance that helps to secure/mount walk-off compensation medium 252 within/on tilt-ball mount 254. Other materials and/or configurations for keeping walk-off compensation medium 252 within through-hole aperture 255 will depend on a given application and will be apparent in light of this disclosure.

In accordance with an embodiment, tilt-ball mount 254 may be configured to be adjusted (e.g., tilted, rolled, etc.) manually and/or mechanically to reposition walk-off compensation medium 252 (e.g., relative to the output beam of non-linear converter 210). In some embodiments, tilt-ball mount 254 may provide/imbue walk-off compensation mechanism 250 with an integral tilt function, which may permit, for example, precision beam directing to help achieve sufficient overlap (e.g., beam centroid spatial translation to mitigate beam spatial walk-off) of the emissions from non-linear converter 210 (e.g., OPO), for instance, in the far field.

In some cases, it may be desirable to adjust tilt-ball mount 254 to a given angle that is, in one specific example embodiment, the exact opposite angle of non-linear medium 230 implemented upstream in non-linear converter 210. However, the claimed invention is not so limited, for instance, and in accordance with an embodiment of the present invention, so long as walk-off compensation medium 252 is properly oriented within tilt-ball mount 254 (e.g., the walk-off compensation crystal 252 is correctly inserted front-to-back within through-hole aperture 255 of tilt-ball mount 254), walk-off compensation mechanism 250 may be capable of being adjusted several degrees without significantly changing the quality of the walk-off compensation (e.g., still achieve the desired beam centroid spatial translation to mitigate beam spatial walk-off).

As will be appreciated, if walk-off compensation medium 252 comprises a high-refractive-index material (e.g., a ZGP or CdSiP$_2$ crystal) and is of sufficient length, then adjustment of tilt-ball 254 including such walk-off compensation medium 252 may result in significant displacement of all output beams together. Thus, and in accordance with an embodiment, this may be useful for applications which require that the output beams be centered with respect to the output telescope lenses, for example.

As previously noted, and in accordance with an embodiment of the present invention, combination of a walk-off compensation medium 252 with a tilt-ball mount 254 to produce a walk-off compensator mechanism 250 having an integral tilt function may eliminate, for example, the need to include within a given laser system a tilt-ball (with its attendant thick glass piece) that is separate and discrete from its walk-off compensation medium (e.g., such as with the example approach represented in FIG. 1).

As previously noted, tilt-ball mount 254 may be adjusted manually and/or mechanically into a given position that yields the desired output beam (e.g., as indicated by test equipment monitoring the output beam). As will be appreciated, it may be desirable to minimize/prevent any subsequent, unwanted movement of tilt-ball mount 254 (and thus walk-off compensation medium 252) once a desired position/orientation is achieved. Thus, and in accordance with an embodiment, a stabilizer (e.g., physical clamp, magnetic clamp, shim, adhesive/glue, etc.) may be implemented to secure/stabilize walk-off compensation mechanism 250 in a given position temporarily and/or permanently. However, the claimed invention is not so limited; for example, and in accordance with an embodiment, in some cases proper balancing of the tilt-ball mount 254 may be sufficient to prevent such unwanted movement.

Figure 4:
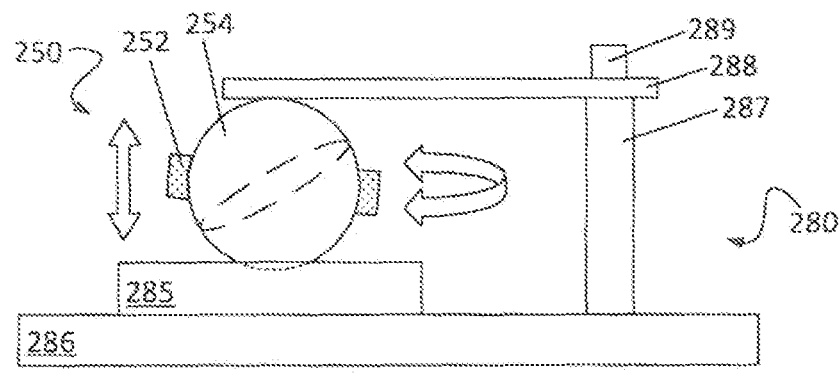
FIG. 4 is a perspective view of a walk-off compensation mechanism with a stabilizer, configured in accordance with an embodiment of the present invention.

FIG. 4 is a perspective view of a walk-off compensation mechanism 250 with a stabilizer 280, configured in accordance with an embodiment of the present invention. As can be seen, walk-off compensation mechanism 250 (e.g., tilt-ball mount 254) may be seared in or otherwise adjustably coupled with, for example, a tilt-ball seat 285. Tilt-ball seat 285 may be configured to permit tilt-ball 254 (and thus walk-off compensation medium 252) to be adjusted (e.g., tilted, rolled, etc.) to achieve a variety of positions/orientations, in accordance with an embodiment. As can further be seen, tilt-ball seat 285 may be secured or otherwise integrated into a chassis 286 or other suitable structure/support.

Once in the desired position/orientation, a clamping mechanism, for example, may be implemented to engage and secure/stabilize tilt-ball mount 254 (and thus walk-off compensation medium 252) in a given orientation. For instance, and in accordance with one specific example embodiment, the clamping mechanism may comprise a post 287, a clamp arm 288, and a fastener 289. Clamp arm 288 may be brought into contact with a portion of walk-off compensation mechanism 250 (e.g., the exterior surface of tilt-ball mount 254) and may be held at (e.g., locked into) such location by fastener 289 (e.g., a screw, threaded bolt, or other suitable fastener, etc.), which is received by a corresponding portion of post 287. Consequently, tilt-ball mount 254 (and thus walk-off compensation medium 252) may be held/stabilized in position within tilt-ball seat 285. Other suitable configurations and/or stabilizer components will depend on a given application and will be apparent in light of this disclosure.

As will be appreciated in light of this disclosure, a ball-in-seat configuration (e.g., walk-off compensation mechanism 250 adjustably coupled with stabilizer 280) may be implemented, for example, in applications where a wide displacement range is desired. In some other embodiments in which only a small range of displacement is desired, walk-off compensation mechanism 250 may be operatively coupled, for example, with an azimuth/elevation flexure arrangement.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
    a non-linear converter configured to receive a pump beam and generate an output beam; and
    a walk-off compensation mechanism configured to receive the output beam of the non-linear converter and having an integral tilt function, wherein the walk-off compensation mechanism is configured to be at least one of tilted and rolled to achieve walk-off compensation for the output beam.

2. The system of claim 1, wherein the non-linear converter comprises an optical parametric oscillator (OPO).

3. The system of claim 1, wherein the non-linear converter utilizes a non-linear medium comprising at least one of a zinc germanium phosphide ($ZnGeP_2$) crystal and a cadmium silicon phosphide ($CdSiP_2$) crystal of a given cut.

4. The system of claim 1, wherein the walk-off compensation mechanism comprises:
    a tilt-ball mount having a through-hole aperture formed therein; and
    a walk-off compensation medium, wherein at least a portion of the walk-off compensation medium is disposed within the through-hole aperture of the tilt-ball mount.

5. The system of claim 4, wherein the tilt-ball mount has a geometry that is spherical, cylindrical, ellipsoidal, polyhedral, or prismatic.

6. The system of claim 4, wherein the walk-off compensation medium comprises a zinc germanium phosphide ($ZnGeP_2$) crystal or a cadmium silicon phosphide ($CdSiP_2$) crystal.

7. The system of claim 4, wherein the walk-off compensation medium at least one of comprises the same material as the non-linear medium and has the same cut as the non-linear medium.

8. The system of claim 4 further comprising a stabilizer, wherein the stabilizer comprises:
    a seat configured to receive a first portion of the tilt-ball mount;
    a chassis configured to support the seat;
    a post operatively coupled to the chassis;
    a clamp arm operatively coupled to the post, wherein the clamp arm is configured to engage a second portion of the tilt-ball mount; and
    a fastener configured to secure the clamp arm once it engages the second portion of the tilt-ball mount.

9. The system of claim 1, wherein the walk-off compensation mechanism is configured to be at least one of tilted and rolled to achieve precision directing for the output beam.

* * * * *